April 4, 1939.   A. J. STEINBERGER   2,153,351
TEXTILE ARTICLE
Filed Jan. 24, 1936
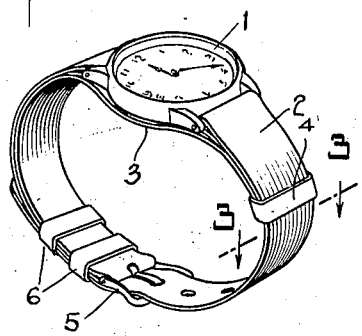
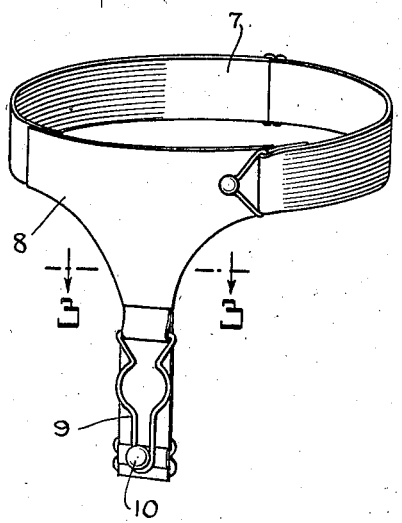
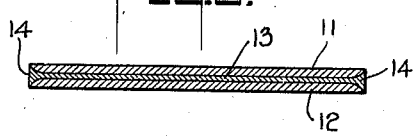
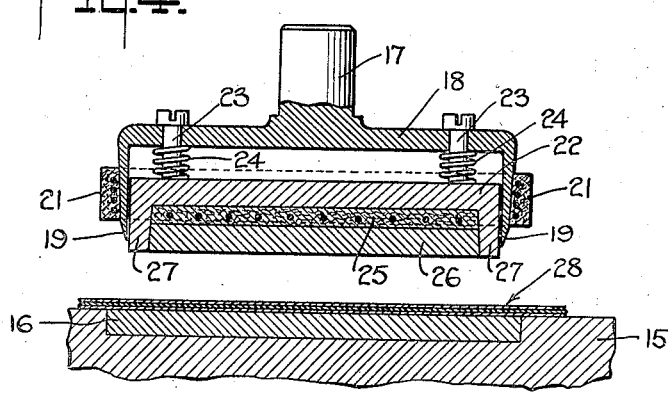
INVENTOR
Alfred J. Steinberger
BY
ATTORNEYS Patented Apr. 4, 1939

2,153,351

UNITED STATES PATENT OFFICE 2,153,351

TEXTILE ARTICLE

Alfred J. Steinberger, Jamaica, N. Y., assignor to Celanese Corporation of America, a corporation of Delaware Application January 24, 1936, Serial No. 60,746

6 Claims. (Cl. 154—46)

This invention relates to articles formed of a laminated textile material, at least one layer of which contains an organic thermoplastic material, and more particularly to an article in which the organic thermoplastic material is employed to seal and finish the edges, thus dispensing with hems and stitches at that portion of the article.

An object of the invention is the economic and expeditious production of articles having finished non-fraying edges comprising at least two layers, one of which contains a plastic material. Another object of the invention is the production of articles formed of a plurality of layers of plastic material, which articles are free from hems, stitching, etc. Other objects of the invention will appear from the following detailed description and drawing.

In the drawing wherein like numbers refer to the same or similar elements in the respective views, Figure 1 is a perspective view of a wrist watch having a wrist band thereon formed in accordance with this invention, Figure 2 is a perspective view of a garter, the pad portion of which is formed in accordance with this invention, Figure 3 is a cross-sectional view taken on the line 3—3 of either Figure 1 or 2 and Figure 4 is a cross-sectional view in elevation of a device adapted to be used in forming articles in accordance with my invention.

Articles of wearing apparel and industrial articles have been made having straps, pads and other parts thereof formed of a plurality of layers of textile material, leather, etc., which layers were stitched together and bound against fraying and finished at the edges, for example, by hems or by a button hole stitching. The binding stitches in the body of the article often marred the appearance of the article. Furthermore, the binding stitches, upon use of the article, became broken, whereupon the laminations became separated and gave the article a blistered appearance. Where the article is adapted to be used next to a person's skin in the form of a strip or pad, the hem or stitching at the edges, which naturally formed raised ridges, caused the article to irritate and mark the skin of the wearer. By employing my invention, articles may be formed, from laminated textile and other sheet material, that have finished non-fraying edges without employing stitches or hems, thus overcoming the objections made to laminated articles made by the prior methods.

In accordance with this invention, I form articles of wearing apparel, industrial articles or parts thereof by laminating and coalescing together at least two layers of sheet material and cutting the assembly of materials with a heated cutting element in such a manner that the thermoplastic material contained therein flows at the edge into the adjacent layer or layers of material to seal the same against fraying, raveling, tearing, etc. The coalescing of the layers together is effected by the employment of a thermoplastic material in at least one sheet of the assembly. Outstanding examples of suitable thermoplastic materials for the purpose herein described are fabrics or other sheet material containing organic derivatives of cellulose.

This invention is applicable to the formation of any article requiring laminated textile and sheet material. For the purpose of describing this invention and in the appended claims, the term "textile material" is intended to include not only woven, knitted, knotted or netted fabrics but also such other sheet material as leather, felt, imitation leather and like sheet materials employed in making industrial articles and wearing apparel. This invention may be employed in the manufacture of wrist watch bands, garter fronts or pads, suspender ends or straps, belts, anchoring tabs for tent guy ropes, straps, tapes, tongues for shoes and slippers, collars, hat bands, etc.

As an aid in describing the invention, description will be made with particular reference to the drawing, referring especially to Figures 1 to 3. In Figure 1 there is shown a wrist watch 1 having a wrist strap 2 of usual shape having an enlarged portion 3 of substantially or slightly larger area than the back face of the watch and adapted to prevent the watch from touching the skin of the wearer. The wrist band may contain suitable adjusting means 4, a buckle 5 and end holding members 6. In Figure 2, there is shown a garter having a flexible elastic band 7 of the usual type. This flexible band 7 is attached to a pad 8, which pad is made from a plurality of layers of material in accordance with this invention. The pad 8 may have mounted thereon hose engaging grip members 9 and 10. These members may be attached to the pad by laminating the same into the pad during the formation of said pad.

The straps, pads, etc., made in accordance with this invention may consist of a front layer 11 and a back or lining layer 12 with an intermediate layer 13. The front and back layers 11 and 12 are formed of non-thermoplastic material, while the intermediate layer 13 is formed of a thermoplastic material and is coalesced to the layers 11 and 12 in such a manner as to bind the two layers together. This assembly of layers is stamped or cut with a heated cutting element such that the thermoplastic material of the layer 13 is caused to flow at the edges as shown at 14, effecting a binding in of the integral parts of the edges 11 and 12, thus eliminating any necessity for forming at this section a hem or a button hole stitching, or otherwise arranging the edges to prevent fraying.

In Figure 4 there is shown somewhat in detail a part of a device that may be employed in forming the articles in accordance with this invention. It is to be understood that this device forms a part of my invention. This device comprises a table or base member 15 having a cutting bed, for example, a substantially soft or yielding pad 16. This pad may be made of wood, soft metal or other material commonly employed as the bed plate for cutting elements. Mounted in any suitable mechanism for raising and lowering the same, not shown, there is a heated cutting element comprising a shank 17 adapted to be grasped by said mechanism. The shank 17 is connected with a die 18 having the general configuration of the article desired. The die 18 is provided with a cutting edge or edges 19. The cutting edge 19, or, as it may be termed, blade, is surrounded by a heating element 21. The heating element may be an electrical resistance coil suitably insulated or it may be of any other suitable type for heating the cutting blades to the desired temperature.

Mounted on the interior of the die 18 is an ejector plunger plate 22. This is connected with the die 18 by means of pins 23 that pass through holes in the die and are threaded into or otherwise fastened to the ejector plunger 22. Suitable spring elements 24 may be provided for maintaining the ejector plunger in an extended position when raised from the table 15. If the laminating or binding of the various layers of the assembly is to be accomplished at the same time as the cutting or stamping of the assembly into the shape of an article, then the ejector plunger 22 may be provided with a heating element 25 and a heat conducting plate 26. When employing the heating element 25 and the heat conducting plate 26, it is preferable to have the side portions of the plunger 22, for instance, the parts 27, formed of a material having a lower degree of conductance than the plate 26.

In operation, the assembly 28 of textile materials is placed upon the cutting bed 16 and by means of any suitable mechanism the die 18 is brought down upon the assembly cutting the same to shape at the same time the heated cutting blade 19, which is raised to a temperature above the fusion temperature of the thermoplastic material of the assembly, causes said thermoplastic material to flow at the edges in such a manner as to coalesce and encase the edges of the other layers of the assembly.

In a preferred embodiment of this invention, it is preferable to cause a binding together of the various layers of the assembly prior to cutting or stamping the same. In this modification the assembly is built up from a number of sheets placed in a superimposed position, at least some of the sheets containing thermoplastic materials, and the said assembly caused to bind together or coalesce together by means of pressure under such conditions that the thermoplastic material is caused to become at least partially plastic. The operation of binding the assembly together may be performed in a number of ways which will be described somewhat in detail.

The composition, nature and type of the material in the various layers of the assembly will depend in general upon the requirements of the article for which the material is to be used. For instance, for the purpose of forming wrist watch straps, the front sheet 11 may be formed of a non-thermoplastic taffeta material having a backing 12 of a similar material or of a heavy muslin. The intermediate layer 13 may be a woven or knitted fabric formed of yarns or filaments of organic derivatives of cellulose. As another illustration, when forming pads for garters, the front sheet 11 may be of a light weight leather or an imitation leather, while the back sheet 12 is a satin non-thermoplastic fabric and the intermediate layer 13 is a fabric containing organic derivatives of cellulose.

It is to be understood that the above two illustrations are not intended to limit the types of fabrics that may be assembled into the article. For instance, the front sheet or surface layer 11 of the assembly may be any suitable flexible material that is at least semi-porous. For instance, the front or surface layer of the assembly may be any suitable fabric formed of yarns of linen, silk, wool, cotton, regenerated cellulose, organic derivatives of cellulose, etc., or mixtures of these, that may be felted, woven, warp knitted, circular knitted, netted or knotted or otherwise formed into fabric-like material. Furthermore, the front or surface layer of the assembly may be paper, leather, films of artificial materials, metallic foils, imitation leather and other similar flexible sheet material.

The back or lining layer 12 may be of the same material as the front or surface layer 11 or the same may be of a different material. For forming garter pads, tabs for the end of suspenders, anchorage tabs for tents, shoe and slipper tongues and the like it is generally preferable to use a leather or imitation leather as the surface layer 11 with a satin, a duck or a taffeta as the back layer 12. Furthermore, either the front or surface sheet and the back or lining sheet or both may be formed of laminated sheet material made by placing sheets of thermoplastic material between a plurality of sheets, causing the same to coalesce together by means of pressure under such conditions that the thermoplastic sheet is partially plastic. For instance, an assembly comprising a front or surface sheet, a layer of thermoplastic material, a lining sheet, a thermoplastic sheet and a backing sheet may be coalesced or welded together under the action of heat and/or pressure and under such conditions that the thermoplastic sheets become at least partially plastic. In this manner the articles may be formed having any suitable number of layers provided there is a layer containing thermoplastic material contacting with each layer of non-thermoplastic material.

Any suitable sheet material consisting of thermoplastic material that becomes partially plastic under the influence of pressure, heat and plasticizing reagents may be used as the intermediate layers of the assembly. This layer may be in the form of a fabric. However, films may be employed for producing certain types of articles. It is preferable to form the intermediate layers entirely or in part of yarns of thermoplastic derivatives of cellulose. The fabric adapted to form the intermediate layer of the assembly may be padded with a substantial amount of plasticizer, or the plasticizer may be incorporated in the yarns of thermoplastic derivatives of cellulose by adding the same to the spinning solution from which the said yarns are formed. Also, a fabric adapted to form the intermediate layer or layers of the assembly may be a non-thermoplastic fabric, for instance, one made from cotton, silk, wool or the like, which may have been padded with a thermoplastic derivative of cellulose and a plasticizer therefor, or a non-thermoplastic fabric otherwise coated or impregnated with a thermoplastic derivative of cellulose such as by applying to said fabric, in any suitable manner, an aqueous slurry or a powder containing a thermoplastic derivatives of cellulose with or without a plasticizer. If the fabric or the powder applied to the fabric adapted to form the intermediate layers of the assembly does not contain a plasticizer, the plasticizer may be applied thereto by a padding or spraying operation. Other methods of applying the organic derivative of cellulose to non-thermoplastic fabrics to produce a suitable sheet material to form the intermediate layers of the assembly may be employed.

Any suitable thermoplastic derivative of cellulose may be employed in the adhesive fabric or sheet forming the intermediate layers of the assembly. For example, the thermoplastic material may be one or a mixture of the organic esters of cellulose and cellulose ethers. Examples of organic esters of cellulose are cellulose acetate, cellulose formate, cellulose propionate and cellulose butyrate, while examples of cellulose ethers are ethyl cellulose, methyl cellulose and benzyl cellulose.

In an assembly including a heavy, very porous front or back sheet, it is preferable to use an intermediate sheet formed entirely of an organic derivative of cellulose and plasticizer. However, when forming the assembly from relatively thin or tightly woven sheet material as the front, back or both sheets of the assembly, it is often preferable to use an intermediate sheet containing yarns of non-thermoplastic nature interwoven with yarns containing an organic derivative of cellulose and a plasticizer. The proportions of non-thermoplastic yarns to yarns of a thermoplastic nature may be of any suitable ratio. For instance, the warp of the intermediate layer may consist of yarns formed of an organic derivatve of cellulose, while the weft may be formed of cotton or other non-thermoplastic yarns. However, the reverse of this may be employed, i. e. the warp of the intermediate layer may be of non-thermoplastic derivatives of cellulose. Furthermore, yarns of an organic derivative of cellulose may be interwoven with yarns of a non-thermoplastic nature in either the warp, weft or in both the warp and the weft.

The assembly consisting of layers of sheet material having interposed therebetween layers of a thermoplastic sheet material may be caused to adhere to each other or to be coalesced together by applying heat and pressure to the assembly under such conditions that the thermoplastic sheet material is caused to become swollen, coalesced, fluid or otherwise placed in a state such that it will bind or adhere to the backing layers. This may be accomplished in either of two ways. Thus, where a substantial amount of plasticizer is used along with the organic derivative of cellulose in the intermediate layers, the mere application of heat and pressure in the presence of moisture is sufficient to cause the welding together or coalescing of the assembly. Furthermore, if the amount of plasticizer is small or if no plasticizer is present, a solvent for the organic derivative of cellulose should be present during the heating and pressing operation. The use of a large amount of plasticizer is desired, as many fabrics either of the front, or surface, layer or the back, or lining, layer of the assembly, may be harmfully affected by the application of solvent thereto.

If plasticizer is present, adhesion may be caused by simply pressing with heat, in the presence of moisture, although moisture is not absolutely necessary. The moisture may be present as steam or water or as the water in an aqueous solution. Thus, in employing plasticizer, the laminating of the assembly may be accomplished on any of the ordinary types of wool pressing machines which inject steam into the material being pressed. If a hand iron or similar device is used as a pressing means, the assembly may be dipped into, padded or sprayed with water prior to pressing. Any suitable pressure may be employed, for instance, from 1 to 100 pounds or more per square inch. Any suitable temperature may be employed, which temperature will depend somewhat upon the materials forming the non-thermoplastic sheets of the assembly. In an assembly consisting of a front, or surface, sheet of linen an intermediate sheet containing cellulose acetate and a backing sheet containing a medium weight cotton cloth, temperatures from 65 to 200° C. or more may be employed.

Any suitable plasticizer for the organic derivative of cellulose may be employed in forming the intermediate sheets that are to be used in causing the adhesion, coalescing or welding together of the various layers of the assembly and the reinforcing members. As stated above, when there is present a substantial quantity of plasticizer, the assembly may be caused to adhere or be welded together in the presence of water and without the presence of a solvent for the organic derivative of cellulose. The plasticizer is preferably water-insoluble. However, there may be employed any suitable plasticizer which will make the organic derivative of cellulose more readily susceptible to the action of heat. The plasticizers may be any suitable one for the particular organic derivative of cellulose or mixture of organic derivatives of cellulose employed. Plasticizers may be any of the high boiling or softening agents, as, for example, the aryl sulphonamides such as para ethyl toluol sulphonamide, the alkyl phthalates such as dimethyl phthalate, the dialkyl tartrates such as dibutyl tartrate, the alkoxy esters of polybasic organic acids such as diethoxy ethyl phthalate, and polybasic acid esters of the monoalkyl ethers of polyhydric alcohols, such as diethylene glycol ethyl ether ester of phthalic acid, the alkyl esters of phosphoric acid such as triethylglycol phosphate and tributyl phosphate, the aryl esters of phosphoric acid such as tricresyl phosphate and triphenyl phosphates and the mixed alkyl and aryl phosphates such as ethylglycol dicresyl phosphate The use of heavily plasticized intermediate layers of organic derivatives of cellulose is preferable when employing a front surface layer or a back layer of sheet material containing organic derivatives of cellulose. When employing a substantial amount of plasticizer in the intermediate layers, no solvent is required during the heating and coalescing operations and thus there is eliminated from the process any possibility of injuring the outer layers of the assembly by the action of the solvent being applied thereto. Furthermore, the outer layers may contain organic derivatives of cellulose, which, if not plasticized, are unaffected during the coalescing or welding operation and retain their textile nature and pliability, yet, due to the plasticizer in the intermediate layers, those layers are caused to be coalesced together.

Although this invention has been described with particular reference to the use of organic derivatives of cellulose as the thermoplastic material of the intermediate layers, other thermoplastic materials may be employed. It is of great advantage, however, to employ the organic derivatives of cellulose for this purpose as their welding action is substantially permanent and does not permit of the separation of the various layers upon flexing of the same nor does the adhesion of the layers become less during the life of the article formed from the laminated material. Furthermore, the intermediate layers may be formed of raw rubbers, latex, chlorinated rubber, thermoplastic vinyl resins and the like.

As stated above, a preferred form of the invention is to first form the assembly, bind the layers together and then cut said assembly of layers into the desired shape of the article by means of a heated cutting element. The heated cutting element is preferably maintained at a temperature sufficiently high to effect some liquefication of the thermoplastic material. The best results are obtained when the heated cutting element is of a temperature sufficiently high to not only melt the plastic material but to char the material if left in contact with the same. In such a case the cutting action should be relatively fast so that the heated element is not left in contact with the thermoplastic material for a length of time sufficient to char the same although the temperature is sufficiently high to do that if left in contact therewith. For example, the cutting elements may be maintained at above 350° C. when working on an assembly containing an acetone-soluble cellulose acetate. The cutting operation may be by means of a die as shown in Figure 4 when cutting such articles as wrist watch straps, garter pads and the like. However, for articles of a strap-like nature as suspender straps, belts and the like, the article may be cut and sealed at the edges simultaneously by cutting a relatively wide width of the material into strips, for instance, by pulling the strip past a plurality of spaced knife blades, the knife blades being maintained at an elevated temperature.

If desired, the binding of the various layers of the assembly together and the cutting and sealing of the edges may be performed in one operation. For instance, as shown in Figure 4, the pressure may be exerted upon the surface of the article by a heated element while the same is cut by heated blades, thus performing in one operation the application of heat and pressure to the surface of the assembly to bind the various layers together and cutting and sealing the edges with the heated blade.

It is understood that the foregoing detailed description is given merely by way of illustration and that many variations may be made therein without departing from the spirit of my invention.

Having described my invention, what I desire to secure by Letters Patent is:

1. An article comprising cut laminated material formed of flexible sheets at least one of which is non-thermoplastic and at least one of which is of thermoplastic material, the filaments or fibers along the cut edges of the laminae being coated by the flow of thermoplastic material, whereby the filaments or fibers are bound together and fraying is prevented.

2. An article comprising cut laminated material formed of flexible sheets at least one of which is non-thermoplastic and at least one of which is of an organic derivative of cellulose, the filaments or fibers along the cut edges of the laminae being coated by the flow of the organic derivative of cellulose, whereby the filaments or fibers are bound together and fraying is prevented.

3. An article comprising cut laminated material formed of flexible sheets at least one of which is non-thermoplastic and at least one of which is of cellulose acetate, the filaments or fibers along the cut edges of the laminae being coated by the flow of cellulose acetate, whereby the filaments or fibers are bound together and fraying is prevented.

4. An article comprising cut laminated material formed of a sheet of imitation leather and a textile sheet united together by means of a sheet of thermoplastic material, the filaments or fibers along the cut edges of the laminae being coated by the flow of the thermoplastic material, whereby the filaments or fibers are bound together and fraying is prevented.

5. An article comprising cut laminated material formed of a sheet of imitation leather and a textile sheet united together by means of a sheet containing an organic derivative of cellulose, the filaments or fibers along the cut edges of the laminae being coated by the flow of the organic derivative of cellulose, whereby the filaments or fibers are bound together and fraying is prevented.

6. An article comprising cut laminated material formed of a sheet of imitation leather and a textile sheet united together by means of a sheet containing cellulose acetate, the filaments or fibers along the cut edges of the laminae being coated by the flow of the cellulose acetate, whereby the filaments or fibers are bound together and fraying is prevented.

ALFRED J. STEINBERGER.